United States Patent
Gallo et al.

(10) Patent No.: US 7,539,786 B2
(45) Date of Patent: May 26, 2009

(54) METHOD FOR SIMULATING CARTRIDGE CHANGES IN IMPORT/EXPORT STATION SLOTS IN AN AUTOMATED DATA STORAGE LIBRARY

(75) Inventors: Frank D. Gallo, Tucson, AZ (US); Jose G. Miranda Gavillan, Tucson, AZ (US); Khan V. Ngo, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 425 days.

(21) Appl. No.: 11/205,711

(22) Filed: Aug. 17, 2005

(65) Prior Publication Data
US 2007/0043885 A1 Feb. 22, 2007

(51) Int. Cl.
*G06F 3/00* (2006.01)
*G06F 17/50* (2006.01)
*G01D 3/00* (2006.01)
*G01L 25/00* (2006.01)
*G01C 25/00* (2006.01)

(52) U.S. Cl. .................. 710/19; 702/108; 702/113; 702/115; 702/116; 703/13; 703/21; 703/24; 703/25; 710/15; 710/16; 710/17; 710/18

(58) Field of Classification Search .............. 710/15–19; 703/13, 21, 24–25; 702/108, 113, 115–116
See application file for complete search history.

(56) References Cited

U.S. PATENT DOCUMENTS

| 6,243,332 B1 * | 6/2001 | Dimitri et al. ............ 369/30.31 |
| 6,745,257 B2 * | 6/2004 | Gallo et al. .................. 710/19 |
| 6,795,942 B1 * | 9/2004 | Schwarz ..................... 714/718 |
| 6,823,401 B2 * | 11/2004 | Feather et al. ............... 710/18 |
| 2003/0004668 A1 * | 1/2003 | Gardner et al. ............. 702/116 |
| 2003/0158615 A1 * | 8/2003 | Weber et al. ................. 700/96 |

* cited by examiner

*Primary Examiner*—Tariq Hafiz
*Assistant Examiner*—Jonathan R Plante
(74) *Attorney, Agent, or Firm*—Quarles & Brady LLP

(57) ABSTRACT

A method for simulating the insertion of a data storage medium into or removal of a data storage medium from an input/output station, alternatively referred to as an import/output station. In one application of the invention, a data storage resides in an I/O station slot. A first variable corresponding to this slot is modified to indicate that the slot is actually empty. A command is issued indicating that the I/O station has been accessed, triggering a scan of the slot by an automated robotic accessor. Since the accessor will detect that the slot is, in fact, full, it will report this status to a library manager which will, in turn, update the first variable. The action of updating this variable is reported to associated devices such as a host computer, host application, or other associated device. In this manner, the operation of the library manager and devices receiving status information may be tested without requiring that a physical data storage medium actually be removed and re-inserted.

12 Claims, 12 Drawing Sheets

METHOD FOR SIMULATING CARTRIDGE CHANGES IN IMPORT/EXPORT STATION SLOTS IN AN AUTOMATED DATA STORAGE LIBRARY

BACKGROUND OF THE INVENTION

1. Field of the Invention

This invention is related in general to the field of data management systems. In particular, the invention consists of a method for simulating cartridge changes in Import/Export Station slots in an automated data storage library.

2. Description of the Prior Art

Automated data storage libraries are used for providing cost effective storage and retrieval of large quantities of data. In an automated data storage library, data is stored on data storage media that are, in turn, stored on storage shelves or the like inside the library in a fashion that renders the media, and its resident data, accessible for physical retrieval. Such media is commonly termed "removable media." Data storage media may comprise any type of media on which data may be stored and which may serve as removable media, including but not limited to magnetic media (such as magnetic tape or disks), optical media (such as optical tap or disks), electronic media (such as PROM, EEPROM, flash PROM, Compactflash™, Smartmedia™ Memory Stick™, etc.), or other suitable media.

Typically, the data stored in automated data storage libraries is resident on data storage media that is contained within a cartridge and referred to as a data storage media cartridge. An example of a data storage media cartridge that is widely employed in automated data storage libraries for mass data storage is a magnetic tape cartridge.

In addition to data storage media, automated data storage libraries typically contain data storage drives that store data to, and/or retrieve data from, the data storage media. The transport of data storage media between data storage shelves and data storage drives is typically accomplished by one or more robot accessors (hereinafter termed "accessors"). Such accessors have grippers for physically retrieving the selected data storage media from the storage shelves within the automated data storage library and transporting such media to the data storage drives by moving in the X and Y directions.

Libraries typically use internal addressing to identify cartridge slot locations within the library. The internal addressing of the library is referred to as a library address or a physical address. Libraries typically present cartridge slot locations to host applications by way of an address, commonly referred to as an element address. The hosts' view of library reported address is referred to as a host address or a logical address. In some designs, the library address and the host address for any particular cartridge location may be the same. For example, all physical storage shelves in the library may be assigned a physical address beginning with a starting address and incrementing by one for each sequential slot in the library. This address information is presented by the library to host applications that send commands to the library to move cartridges based on this physical address information.

However, in some designs, the library address and the host address for a particular cartridge location is different. For example, the library may be partitioned into several logical libraries. Each logical library may be assigned to different host computers such that the host associated with one logical library has no awareness of any other logical libraries and associated cartridges. In this example, cartridges associated with one logical library may have the same logical address as seen by its host application as cartridges associated with another logical library as seen by its host application even though the library maintains unique physical addresses for each cartridge.

Virtualization of the storage slots in a library is another example of why the library address and the host address may not be the same. The library maintains a map of host (logical) storage addresses to actual library (physical) addresses when performing move operations and when reporting cartridge locations to a host application. The mapping of the logical address to the actual physical address must be maintained in a consistent fashion by the library so as to ensure proper movement of the intended cartridge. Using virtualization, the library may arbitrarily choose any slot to store media, i.e., the storage slots associated with a range of addresses used by a particular host need to be proximate and/or sequential. Mapping of addresses includes mapping of storage slots with or without media.

A host application manages data in a library using "location-centric" commands, and may utilize a medium changer protocol, such as small-computer systems interface (SCSI). The host application manages cartridge movement by specifying source and destination locations in the system. These source and destination locations are the element addresses reported by the library as host element addresses.

A host element address includes a host import/export element address (IEEA) which appears to the host as the address of an input/output slot. Additionally, the host element address includes a host storage element address which appears to the host as a storage slot location. Location-centric commands issued by a host application which include these host element addresses are mapped by the library to physical element addresses of actual media storage slots.

Host computers maintain a host catalog of these host element addresses, cross-referencing host element addresses with library data storage media cartridges. Each data storage media cartridge may be identified by a volume and serial number (VOLSER). Mapping the host element addresses to a physical element address is managed by the library manager.

In an exemplary automated data storage library, a data storage media cartridge placed into a library's input/output station, sometimes referred to as an import/export station, by either an automated device or an operator is issued an element address based on the physical location of the input/output station or the storage slot into which the cartridge is subsequently placed. In a library wherein the input/output stations and/or storage cells are segregated into cells, a 5-slot cell station may include a first slot having an element address of 100 and each subsequent slot's address would be an incremental increase of the starting slot's address. In this manner, a cartridge placed in the second slot would be given a physical element address of 101.

The element addresses of import/export elements (IEEs) may be virtualized, resulting in the use of virtual import/export element addresses (VIEEAs). In this manner, multiple hosts may share a single physical library and may utilize differing ranges of VIEE addresses for cartridges within its logical library. For example, a first host may be configured to access 10 import/export element addresses (IEEAs) while a second host may be configured to access 20 IEEAs. However, the physical element address for each cartridge may be reported to each host as a different VIEEA. Utilizing virutalization of the IEEAs, the cartridge placed in the second slot of the 5-cell station may posses a physical element address of 101 but be reported to the first host as VIEEA 106. By mapping the physical element address of each cartridge to a VIEEA, the host may continue to represent a particular data storage media as a single host element address, even if the data storage cartridge is moved to another physical element address.

A traditional data storage library, while automated, may require an attendant to insert data storage media into the import/export stations. The attendant must physically open the import/export station, put the data storage media into the import/export slots, and close the import/export station. The availability of the data storage media is then reported by the library manager to any interested host computers or applications. This is typically the only way to physically introduce a data cartridge or like data storage medium into the library. However, sometimes an operator only wishes to test the functionality of the import/export stations and its ability to report its status properly to the library manager and associated host applications. This is especially true when an automated data storage library is being assembled, initialized, re-initialized, configured, or re-configured.

It is inefficient to task a dedicated attendant to operate the import/export stations. It is also inefficient to interrupt a testing procedure while a data storage medium is either inserted or removed from the import/export station. Accordingly, it is desirable to have a method for simulating that a data storage medium has been inserted or removed from an import/export station when, in fact, is has not. If it also desirable that this method of simulation invoke the reporting function of the library manager to associated host applications, computers, and devices.

SUMMARY OF THE INVENTION

The invention disclosed herein employs an algorithm to modify element status information maintained by the library manager in a manner that simulates newly inserted cartridges into the I/O station and the opening and/or closing of an import/export station. If the library manager is presented with this simulated data, the library manager will attempt to verify this change and update its information. These changes are then reported to other library managers, host applications, host computers, or other devices, as necessary. This reporting feature can be observed by an operator to ascertain if the automated data storage library is operating properly, is properly configured, and properly interfaced with other devices. An advantage of this invention is that no attendant is required to physically insert and remove data storage media from the import/export stations. In other words, the library manager will "think" that there are constantly newly inserted cartridges in the I/O station.

Various other purposes and advantages of the invention will become clear from its description in the specification that follows and from the novel features particularly pointed out in the appended claims. Therefore, to the accomplishment of the objectives described above, this invention comprises the features hereinafter illustrated in the drawings, fully described in the detailed description of the preferred embodiments and particularly pointed out in the claims. However, such drawings and description disclose just a few of the various ways in which the invention may be practiced.

DESCRIPTION OF THE PREFERRED EMBODIMENTS

This invention is based on the idea of using an algorithm to simulate the insertion or removal of data storage media, such as tape cartridges, at an import/export station of an automated data storage library. The invention disclosed herein may be implemented as a method, apparatus or article of manufacture using standard programming or engineering techniques to produce software, firmware, hardware, or any combination thereof. The term "article of manufacture" as used herein refers to code or logic implemented in hardware or computer readable media such as optical storage devices, and volatile or non-volatile memory devices. Such hardware may include, but is not limited to, field programmable gate arrays ("FPGAs"), application-specific integrated circuits ("ASICs"), complex programmable logic devices ("CPLDs"), programmable logic arrays ("PLAs"), microprocessors, or other similar processing devices.

Figure 1:
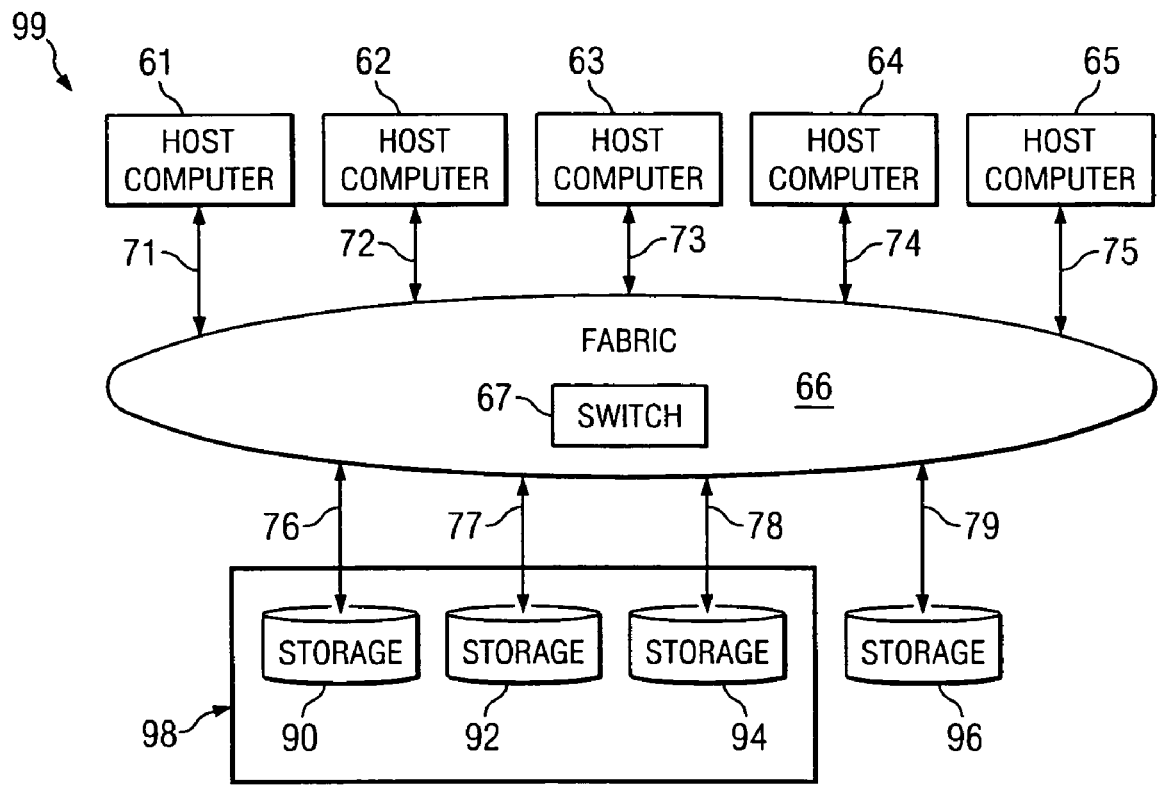
FIG. 1 is a block diagram illustrating a storage area network including a plurality of host computers, a fabric switch, a plurality of media storage devices, and a library controller.

Referring to figures, wherein like parts are designated with the same reference numerals and symbols, FIG. 1 is a block diagram that illustrates aspects of an exemplary storage area network ("SAN") 99, according to one embodiment of the present invention. The SAN 99 is designed as a switched-access-network, wherein switches 67 are used to create a switching fabric 66. In this embodiment of the invention, the SAN 99 is implemented using Small Computer Systems Interface (SCSI) protocol running over a Fibre Channel ("FC") physical layer. However, the SAN 99 could be implemented utilizing other protocols, such as Infiniband, FICON, TCP/IP, Ethernet, Gigabit Ethernet, or iSCSI. The switches 67 have the addresses of both the hosts 61, 62, 63, 64, 65 and storage units 90, 92, 94, 96.

Host computers 61, 62, 63, 64, 65 are connected to the fabric 66 utilizing I/O interfaces 71, 72, 73, 74, 75 respectively to fabric 66. I/O interfaces 71-75 may be any type of I/O interface; for example, a FC loop, a direct attachment to fabric 66 or one or more signal lines used by host computers 61-65 to transfer information respectfully to and from fabric 66. Fabric 66 includes, for example, one or more FC switches 67 used to connect two or more computer networks. In one embodiment, FC switch 67 is a conventional router switch.

Switch 67 interconnects host computers 61-65 to storage 90, 92, 94, and 96 across respective I/O interfaces 76-79. I/O interfaces 76-79 may be any type of I/O interface, for example, a Fibre Channel, Infiniband, Gigabit Ethernet, Ethernet, TCP/IP, iSCSI, SCSI I/O interface or one or more signal lines used by FC switch 67 to transfer information respectfully to and from storage 90, 92, 94, and 96. In the example shown in FIG. 1, storage 90, 92, and 94 are stored within automated storage library 98, and storage 96 is network attached storage ("NAS").

Figure 2:
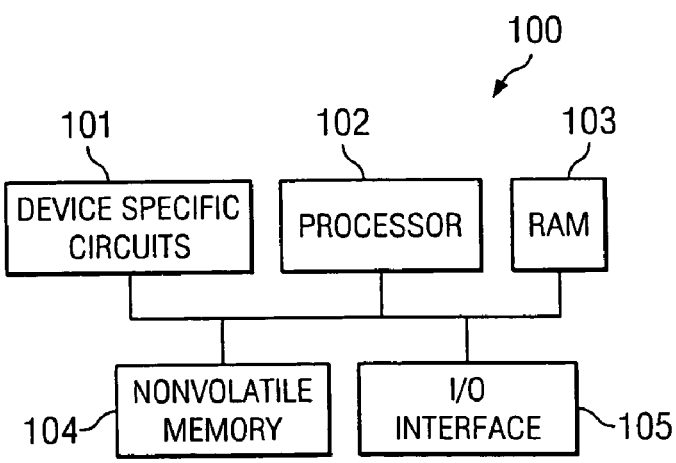
FIG. 2 is a block diagram illustrating the primary components of a library controller including a processors, non-volatile memory, and random-access memory.

An automated data storage library typically comprises one or more controllers 100 to direct the operation of the library. The controller may take many different forms and may include an embedded system, a distributed control system, a personal computer, workstation, etc. FIG. 2 shows a typical library controller 100 with a processor 102, random access memory ("RAM") 103, nonvolatile memory 104, device specific circuits 101, and an I/O interface 105.

Alternatively, the RAM 103 and/or nonvolatile memory 104 may be contained in the processor 102 as well as the device specific circuits 101 and I/O interface 105. Processor 102 may include an off-the-shelf microprocessor, custom processor, FPGA, ASIC, or other form of discrete logic. RAM 103 is typically used to hold variable data, stack data, executable instructions, etc. The nonvolatile memory 104 may comprise any type of nonvolatile memory such as Electrically Erasable Programmable Read Only Memory ("EEPROM"), flash Programmable Read Only Memory ("PROM"), battery backup RAM, hard disk drive, or other similar device.

The nonvolatile memory 104 is typically used to hold the executable firmware and any nonvolatile data. I/O interface 105 comprises a communication interface that allows processor 102 to communicate with devices external to the controller. Examples of I/O interface 105 include serial interfaces such as RS-232 or USB (Universal Serial Bus), SCSI (Small Computer Systems Interface), Fibre Channel, etc. In addition, I/O interface 105 may comprise a wireless interface such as radio frequency ("RF") or Infrared. The device specific circuits 101 provide additional hardware to enable the controller 100 to perform unique functions such as motor control of a cartridge gripper, etc.

Device specific circuits 101 may comprise electronics that provide Pulse Width Modulation (PWM) control, Analog to Digital Conversion (ADC), Digital to Analog Conversion (DAC), etc. In addition, all or part of the device specific circuits 101 may reside outside controller 100.

Figure 3:
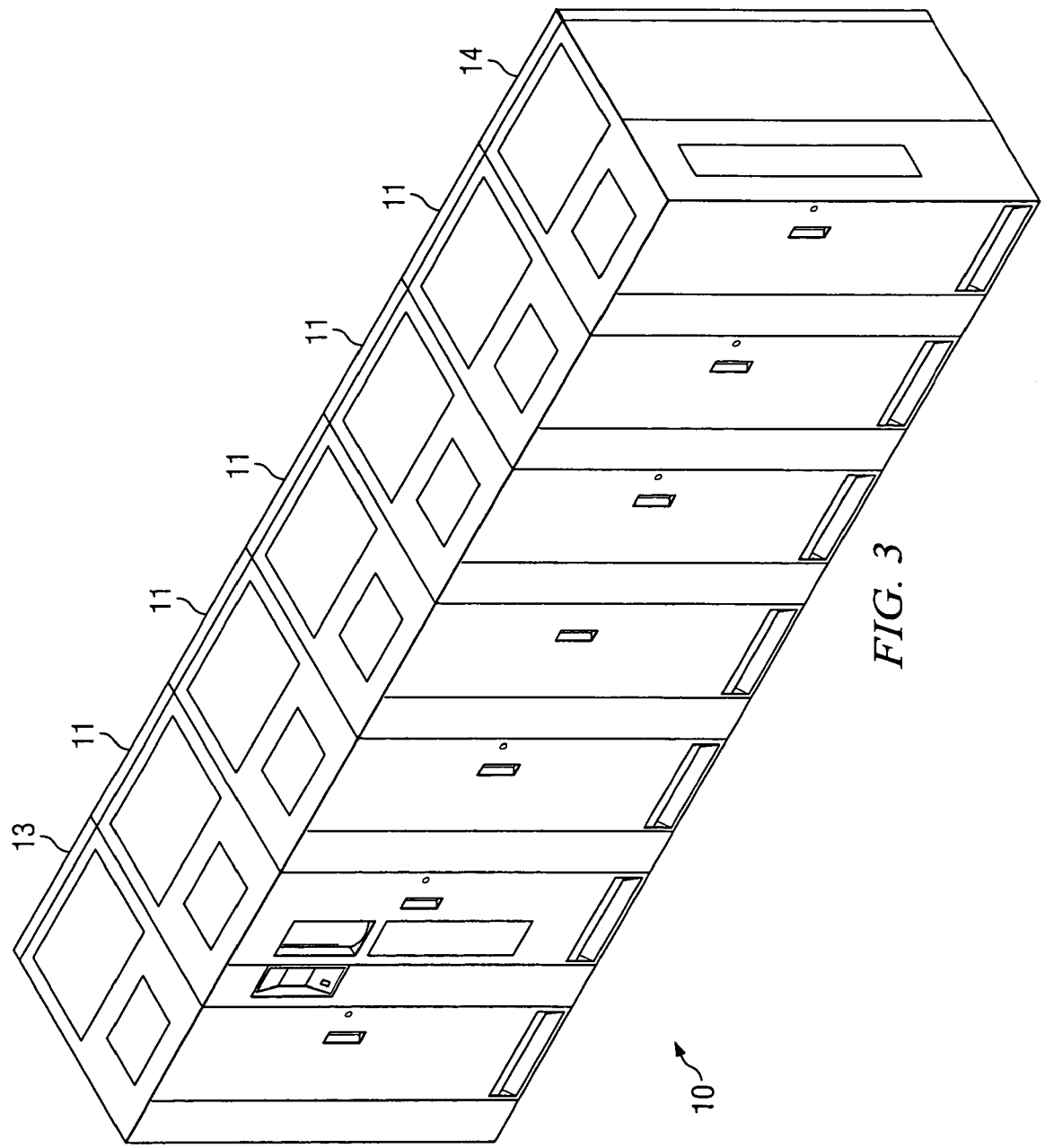
FIG. 3 illustrates an automated data storage library with a left hand service bay, one or more storage frames, and a right hand service bay.

FIG. 3 illustrates an automated data storage library 10 with left hand service bay 13, one or more storage frames 11, and right hand service bay 14. A frame may include an expansion component to the library. Frames may be added or removed to expand or reduce the size and/or functionality of the library. Frames may also include storage shelves, drives, import/export stations, accessors, operator panels, etc.

Figure 4:
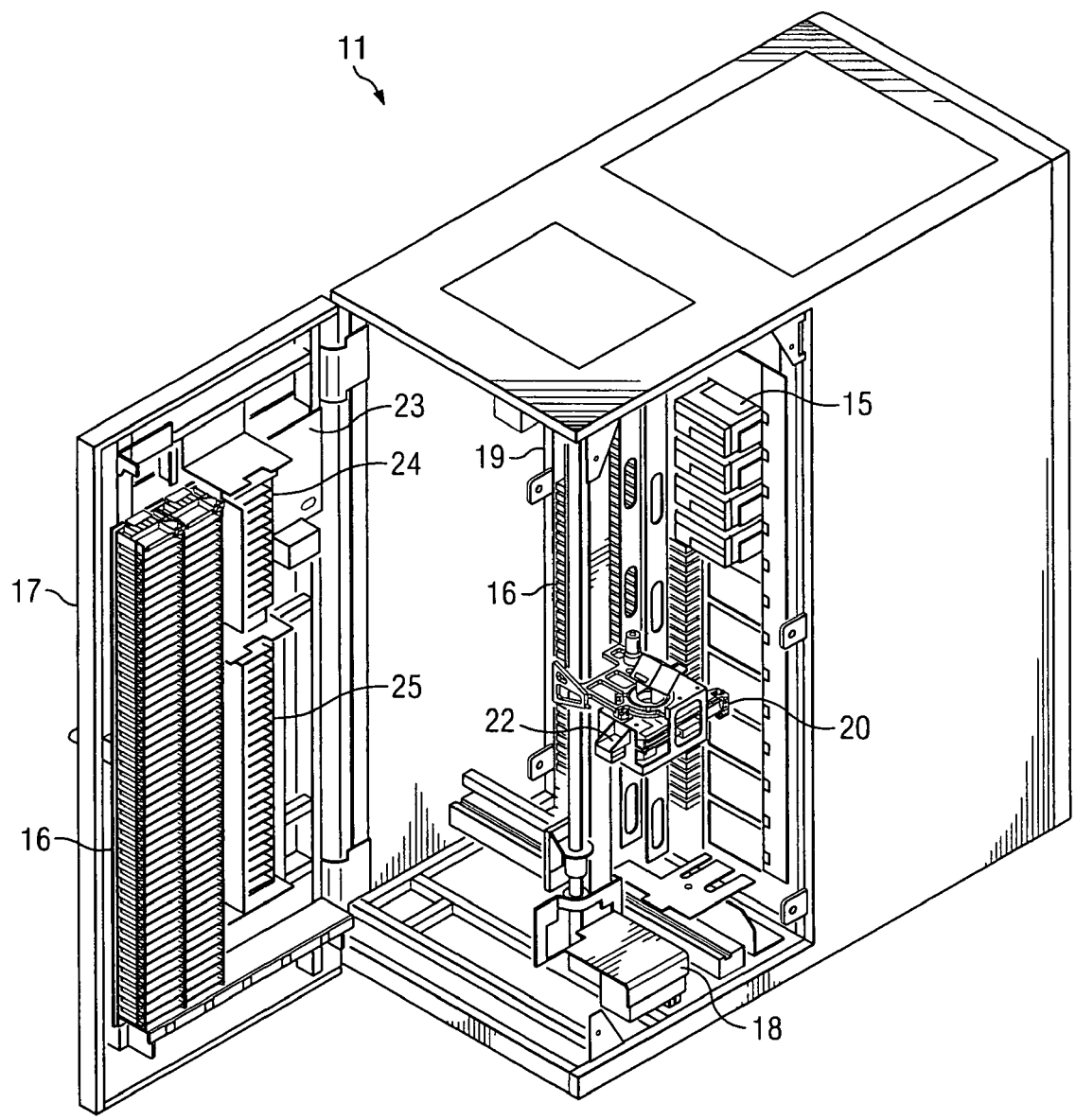
FIG. 4 shows an example of the storage frame of FIG. 3.

FIG. 4 shows an example of a storage frame 11, a configuration of the library 10 in FIG. 3. In this configuration, the library is arranged for accessing data storage media (not shown) in response to commands from at least one external host system (not shown), and comprises a plurality of storage shelves 16, on front wall 17 and rear wall 19, for storing data storage cartridges that contain data storage media; at least one data storage drive 15 for reading and/or writing data with respect to the data storage media; and a first accessor 18 for transporting the data storage media between the plurality of storage shelves 16 and the data storage drives 15. The storage frame 11 may optionally comprise an operator panel 23 or other user interface, such as a web-based interface, which allows a user to interact with the library.

The storage frame 11 may also include an upper I/O station 24 or a lower I/O station 25, which allows data storage media to be inserted into the library and/or removed from the library without disrupting library operation. Additionally, the library 10 may contain one or more storage frames 11, each having storage shelves 16 accessible by first accessor 18. As described above, an attendant may physically insert data storage media into and remove data storage media from the I/O stations. In this manner, tape cartridges may be introduced into or removed from the automated data storage library. The storage frames may be configured with different components depending upon the intended function.

One configuration of storage frame 11 may comprise storage shelves 16, data storage drives 15, and other optional components to store and retrieve data from the data storage cartridges. The first accessor 18 includes a gripper assembly 20 for gripping one or more data storage media and may also include a bar code scanner 22 or reading system, such as a smart card reader or similar system, mounted on the gripper 20, to read or write identifying information about the data storage medium to a cartridge memory.

Figure 5:
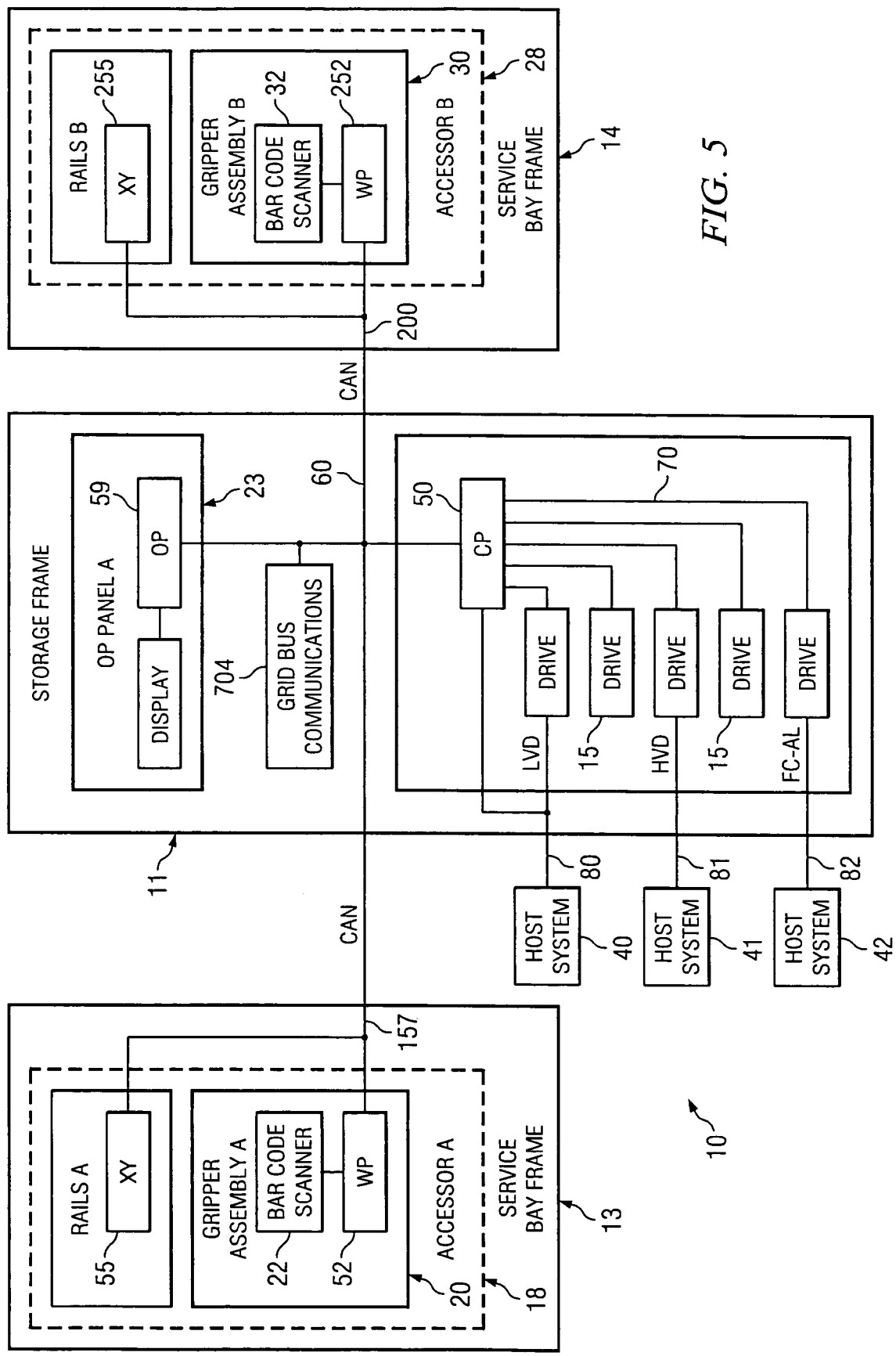
FIG. 5 illustrates internal components of the automated data storage library of FIGS. 3 and 4.

FIG. 5 illustrates internal components of the automated data storage library 10 of FIGS. 3 and 4, employing a distributed system of modules with a plurality of processor nodes. An example of an automated data storage library which may implement the present invention is the IBM 3584 UltraScalable Tape Library®. While the library 10 has been described as a distributed control system, this invention applies equally to libraries that incorporate other control configurations such as one or more library controllers that are not distributed. The library of FIG. 5 includes one or more storage frames 11, a left hand service bay 13 and a right hand service bay 14.

The left hand service bay 13 is shown with a first accessor 18. As discussed above, the first accessor 18 includes a gripper assembly 20 and may include a reading system 22 to read or write identifying information about the data storage medium to a cartridge memory. The right hand service bay 14 is shown with a second accessor 28. The second accessor 28 includes a gripper assembly 30 and may include a reading system 32 to read or write identifying information about the data storage media, for example, to a cartridge memory. In the event of a failure or other unavailability of the first accessor 18, or its gripper 20, etc., the second accessor 28 may perform all of the functions of the first accessor 18. The two accessors 18, 28 may share one or more mechanical paths or they may comprise completely independent mechanical paths. In one example, the accessors 18, 28 may have a common horizontal rail with independent vertical rails. The first accessor 18 and the second accessor 28 are described as first and second for descriptive purposes only and this description is not meant to limit either accessor to an association with either the left hand service bay 13, or the right hand service bay 14. In addition, the present invention may operate with fewer or more than two accessors.

In the exemplary library, the first accessor 18 and the second accessor 28 move their grippers in at least two directions, called the horizontal "X" direction and vertical "Y" direction, to retrieve and grip, or to deliver and release the data storage media at the storage shelves 16 and to load and unload the data storage media at the data storage drives 15. The exemplary library 10 receives commands from one or more host systems 40, 41, 42 or for example, hosts 61-65 shown in FIG. 1. The host systems, such as host servers, communicate with the library directly, e.g., on path 80, through one or more control ports (not shown), or through one or more data storage drives 15 on paths 81, 82, providing commands to access particular data storage media and move the media, for example, between the storage shelves 16 (FIG. 4) and the data storage drives 15. The commands are typically logical commands identifying the media and/or logical locations for accessing the media.

The exemplary library is controlled by a distributed control system receiving the logical commands from hosts, determining the required actions, and converting the actions to physical movements of first accessor 18 and/or second accessor 28.

In the exemplary library, the distributed control system includes a plurality of processor nodes 50, each having one or more processors. In one example of a distributed control system, a communication processor node 50 may be located in a storage frame 11. The communication processor node provides a communication link for receiving the host commands, either directly or through the drives 15, via at least one external interface, e.g., coupled to line 80.

The communication processor node 50 may additionally provide a communication link 70 for communicating with the data storage drives 15. The communication processor node 50 may be located in the frame 11, close to the data storage drives 15. Additionally, in an example of a distributed processor system, one or more additional work processor nodes are provided, which may comprise, e.g., a work processor node 52 that may be located at first accessor 18 and that is coupled to the communication processor node 50 via a network 60, 157. A second work processor node 252 that may be located at second accessor 28 and that is coupled to the communication processor node 50 via a network 60, 200 may also be provided. Each work processor node may respond to received commands that are broadcast to the work processor nodes from any communication processor node, and the work processor node may also direct the operation of first accessor 18, providing move commands. An XY processor node 55 may be provided and may be located at an XY system of first accessor 18. The XY processor node 55 is coupled to the network 60, 157, and is responsive to the move commands, operating the XY system to position the gripper 20. Similarly, an XY processor node 255 may be provided and may be located at an XY system of second accessor 28. The XY processor node 255 is coupled to the network 60.

Also, an operator panel processor node 59 may be provided at the optional operator panel 23 for providing an interface for communicating between the operator panel and the communication processor node 50, the work processor node 52, and the XY processor node 55.

A network, with a common bus 60, is provided, coupling the various processor nodes. The network may include a robust wiring network, such as the commercially available Controller Area Network ("CAN") bus system, which is a multi-drop network, having a standard access protocol and wiring standards, for example, as defined by the CAN in Automation Association ("CiA"). Other networks, such as Ethernet, or wireless 10 network systems, such as RF or infrared, may be employed in the library as is known to those of skill in the art. In addition, multiple independent networks may also be used to couple the various processor nodes.

The communication processor node 50 is coupled to each of the data storage drives 15 of a storage frame 11, via lines 70, communicating with the drives and with host systems 40, 41 and 42. Alternatively, the host systems may be directly coupled to the communication processor node 50, at input 80 for example, or to control port devices (not shown) which connect the library to the host systems with a library interface similar to the drive/library interface. As is known to those of skill in the art, various communication arrangements may be employed for communication with the hosts and with the data storage drives. In the example of FIG. 5, host connections 80 and 81 are SCSI busses. Bus 82 comprises an example of a Fibre Channel-Arbitrated Loop which is a high speed serial data interface, allowing transmission over greater distances than the SCSI bus systems.

The data storage drives 15 may be in close proximity to the communication processor node 50, and may employ a short distance communication scheme, such as SCSI, or a serial connection, such as fibre channel or RS-422. The data storage drives 15 are thus individually coupled to the communication processor node 50 by means of lines 70. Alternatively, the data storage drives 15 may be coupled to the communication processor node 50 through one or more networks, such as a common bus network.

Also in FIG. 5, a grid bus communications 704 is connected to the communication processor node 50 via a network 60. Through communication processor node 50, hosts 40-42 can communicate with grid bus communications 704. Referring to both FIG. 5 and FIG. 7, hosts 40-42 and/or communication processor node 50 can wirelessly query the cartridge memory 703 of removable storage media 700 in storage slots 16. These queries may involve auditing the storage media in the storage slots, to insure that the map of the locations of the storage media in the storage slots is correct. This map of the locations of the storage media is important so that accessors 18 and 28 can go directly to the desired storage slot. This query may also include auditing the status of cleaner cartridges in storage slots 16.

Additional storage frames 11 may be provided and each is coupled to the adjacent storage frame. Any of the storage frames 11 may comprise communication processor nodes 50, storage shelves 16, data storage drives 15, and networks 60.

In FIG. 5 and the accompanying description, the first and second accessors are associated with the left hand service bay 13 and the right hand service bay 14 respectively. This is for illustrative purposes and there may not be an actual association. In addition, network 157 may not be associated with the left hand service bay 13 and network 200 may not be associated with the right hand service bay 14. Depending on the design of the library, it may not be necessary to have a left hand service bay 13 and/or a right hand service bay 14.

Figure 6A:
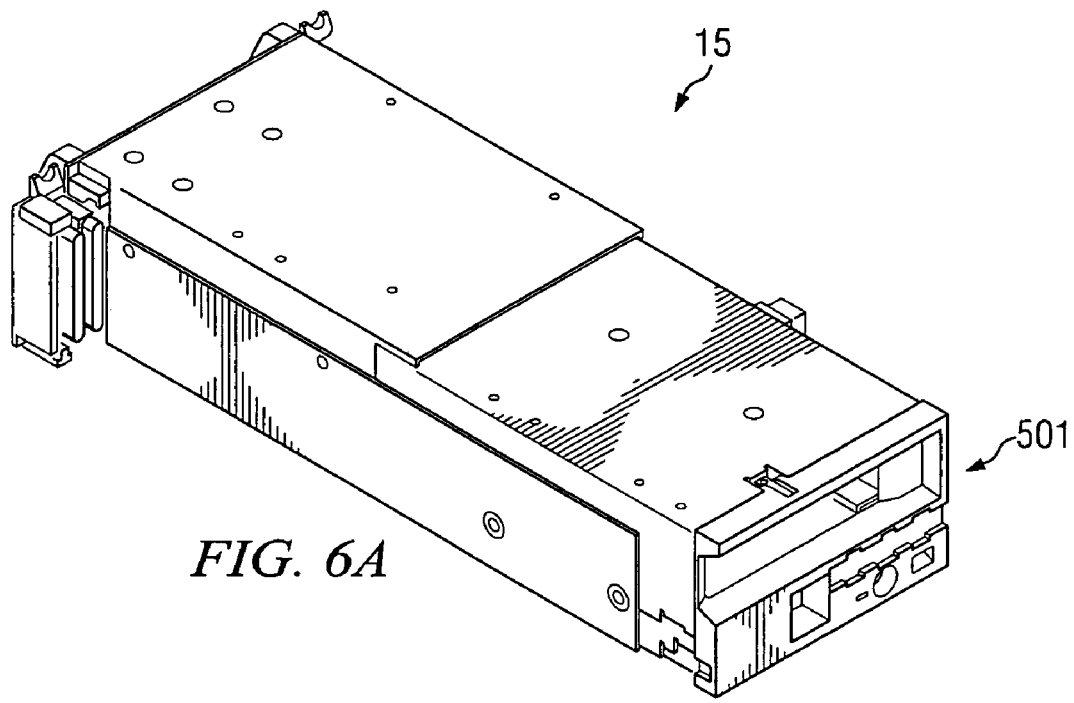
FIG. 6 shows a view of the front and rear of the drive introduced in FIG. 5.
Figure 6B:
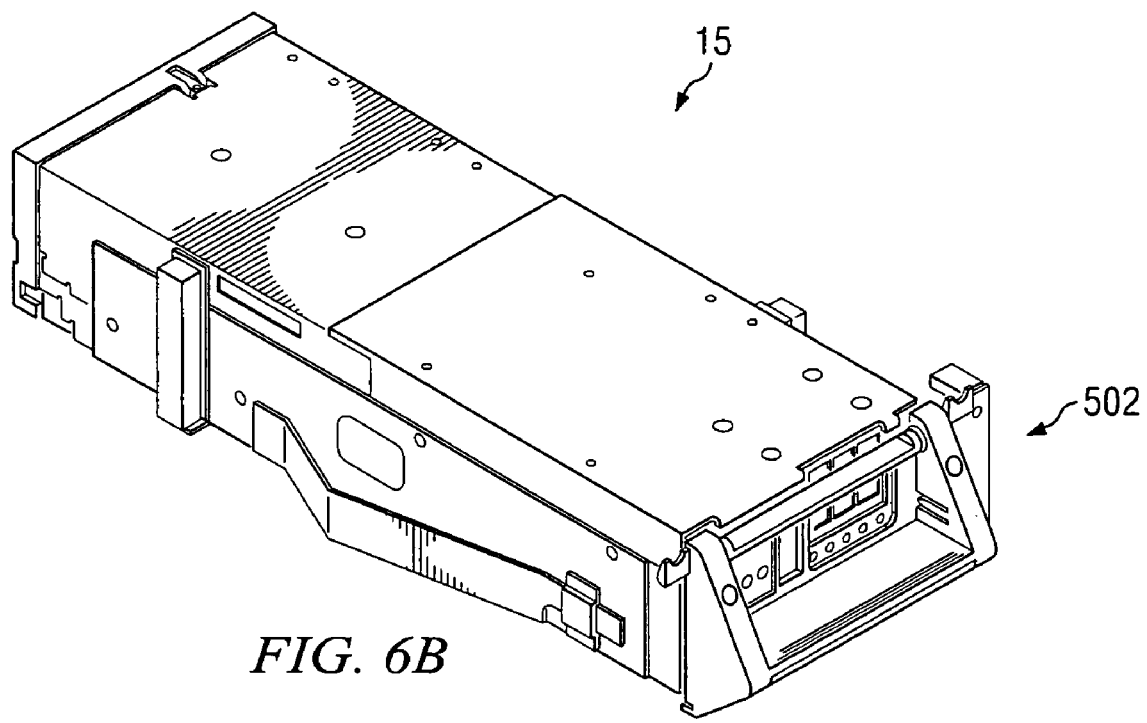

FIG. 6 shows a view of the front 501 and rear 502 of drive 15. In this example, drive 15 is a removable media LTO (Linear Tape Open) tape drive mounted in a drive canister. The drive canister may comprise a housing to hold drive 15, mounting means to attach drive 15 to the drive canister, electrical components, interface cables, interface connectors, etc. The data storage drive of this invention may comprise any removable media drive such as magnetic or optical tape drives, magnetic or optical disk drives, electronic media drives, or any other removable media drive as is known in the art.

Figure 7:
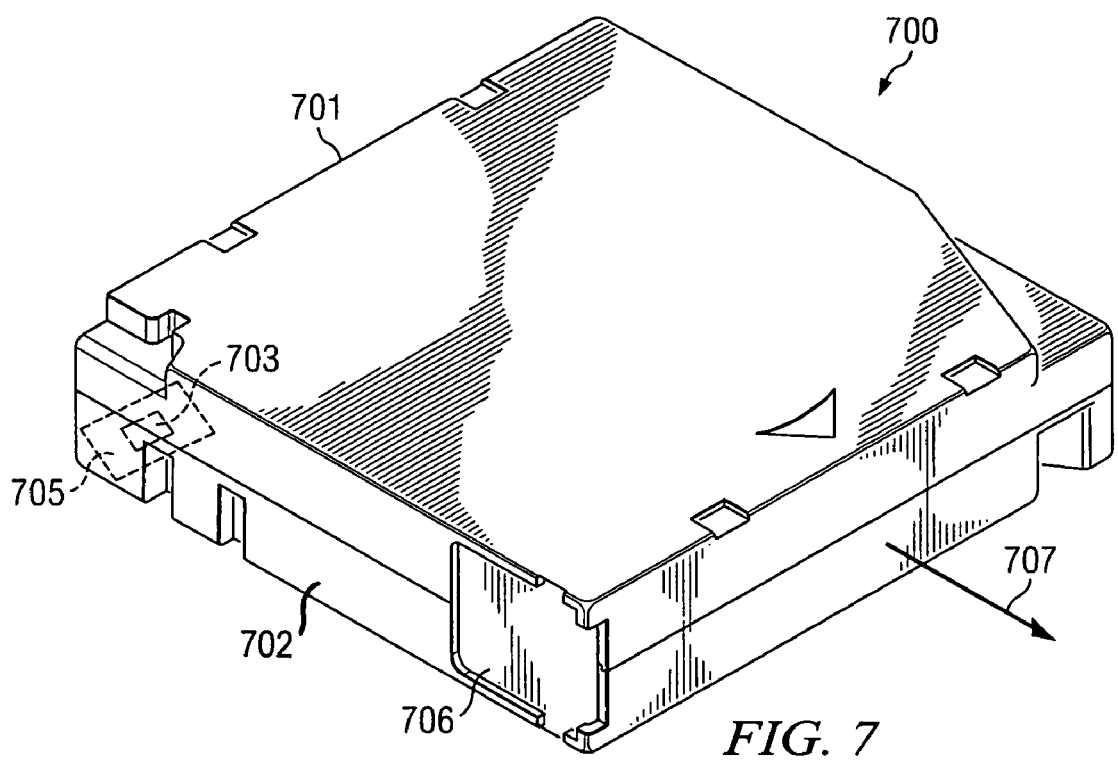
FIG. 7 shows an exemplary removable media cartridge.

FIG. 7 shows an exemplary removable media cartridge, which is tape cartridge 700. Tape cartridge 700 includes upper cartridge-shell 701, lower cartridge-shell 702, and sliding door 706. Sliding door 706 is slid open when tape cartridge 700 is inserted into drive 15. Sliding door 706 is normally closed when tape cartridge 700 is not in use, so that debris and contaminants do not freely enter tape cartridge 700 and degrade tape within the tape cartridge 700. The direction that tape cartridge 700 is slid into drive 15 is shown as direction 707. Tape cartridge 700 also contains cartridge memory 703, which is on printed circuit board 705. Cartridge memory 703 is preferably at a 45 degree angle to the side of the cartridge and the bottom of the cartridge to allow drive 15, accessors 18 and 28, and grid bus communications 704 to wirelessly access the contents of cartridge memory 703. Alternate removable media cartridges are optical disk cartridges, where the optical media may be phase change media such as DVD-RAM (Digital Versatile Disk-Random Access Memory) or DVD-RW (DVD Read-Write) or DVD-R (DVD Write-Once), magneto-optical media, stamped media such as CD-ROM (Compact Disk-Read Only Memory) or DVD-ROM. Alternate removable media cartridges contain flash memory or hard disk drives. An exemplary removable media cartridge containing a hard disk drive is U.S. Pat. No. 6,545,865, which is hereby incorporated by reference in its entirety.

Figure 8:
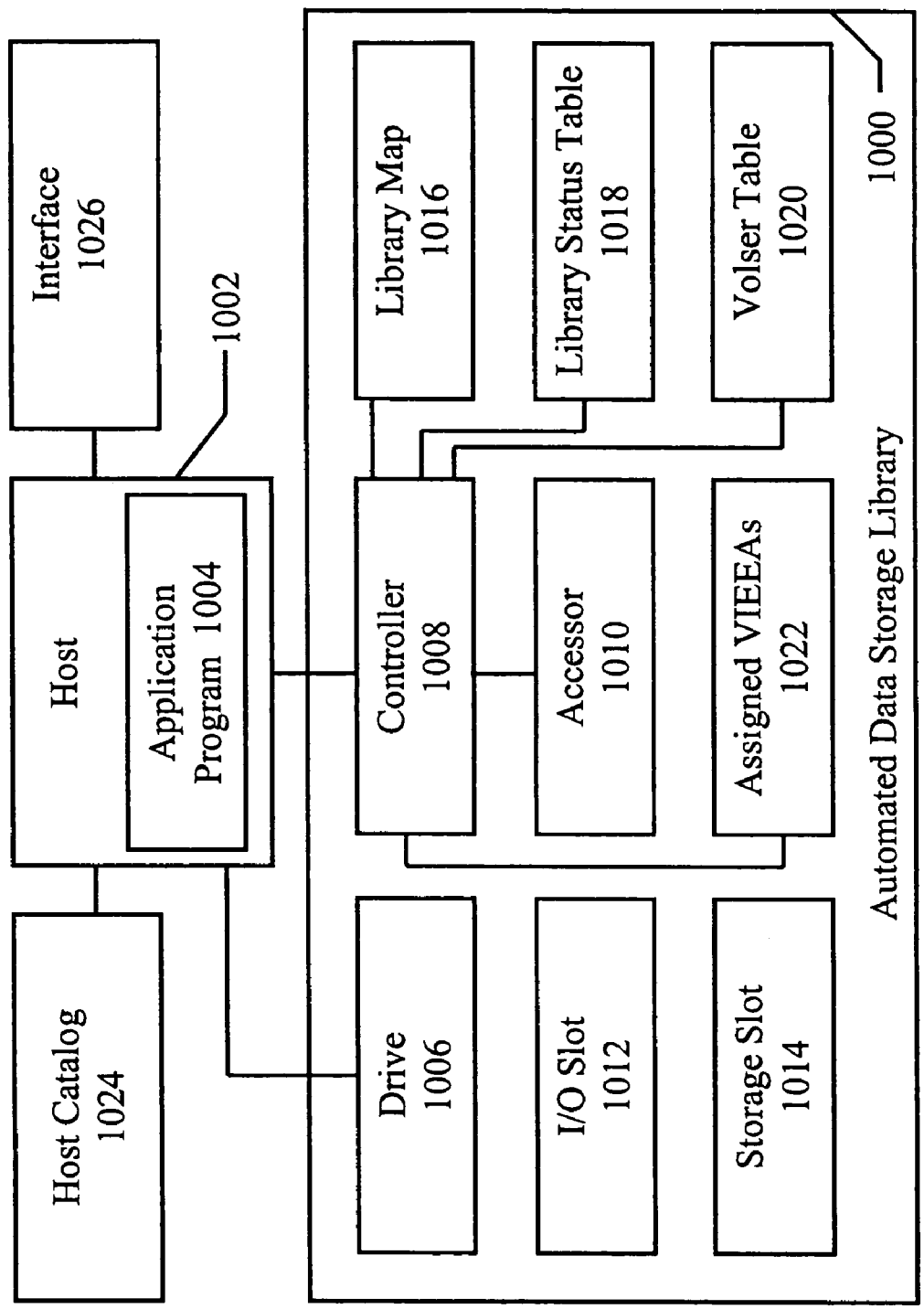
FIG. 8 illustrates, in a block diagram, a computing environment in accordance with certain implementations of the invention.

FIG. 8 illustrates, in a block diagram, a computing environment in accordance with certain implementations of the invention. An automated data storage library 1000 is coupled to a host 1002. One or more application programs 1004 run on the host 1002. The host 1002 supplies data to the library 1000 for storage on the cartridges and sends requests to the library 1000 to retrieve data from the cartridges. The interface 1026 enables the host 1002 to exchange information with a human operator and may comprise a control panel, video monitor, computer keyboard/mouse, or another appropriate human/machine interface.

The host 1002 manages data in the library 1000 using location-centric commands. The host manages cartridge movement by specifying source and destination locations in the system. The source and destination locations are element addresses (e.g., for a host medium transport element, host storage element, host import export element, or host data transfer element).

The host element addresses include "host import export element addresses" (which the host perceives to be I/O slots) and "host storage element addresses" (which the host perceives to be storage slots). As an example, the host element addresses may be established upon configuration of the library 1000 with the host 1002, and would not normally change. There is a different, underlying layer of mapping that correlates the host element addresses with the actual storage slots, called "physical element addresses," which may represent storage slots or I/O slots.

To support its management of the data storage library 1000 according to host element addresses, the host 1002 maintains the host catalog 1024. The host catalog 1024 cross-references each host element address with any cartridge that is stored therein, according to the host's view. The host catalog 1024 maintains host element addresses and cross-references these addresses against the perceived locations in the library 1000 represented by the host element addresses. This information, which includes whether the host element address represents a "import export element" or a "storage element," may be fixed during operation of the host 1002. Alternatively, there may be multiple tables within the host catalog 1024. Here, the host catalog 1024 tracks whether the host element address contains a cartridge or not and the identity of the cartridge (if any) stored at the host element address. This information may include the cartridge's volser.

The data storage library 1000 includes one or more drives 1006 to conduct read/write operations with cartridges in the library 1000. Cartridges are moved to/from the drive 1006 by the accessor 1010.

Storage slots 1014 house cartridges when the cartridges are not being used. The storage slots 1014 comprise shelves or other data storage library compartments. Each storage slot 1014 has a physical element address, which is used by a library to access that storage slot. The physical element address may comprise any addressing scheme usable by the library. For example, a frame/column/row designation, spatial coordinates, arbitrary numbering of physical locations, etc. Additionally, each storage slot 1014 that is treated as either a host import export element or a host storage element may have a host element address, which is used by an application program to access that element.

One or more I/O slots 1012 may be provided to transfer cartridges to/from the library 1000. The I/O slots 1012 include any slots that are marked, known, set aside, positioned, or otherwise designated for an operator to insert cartridges into the library 1000 and remove cartridges therefrom. Using the I/O slots 1012, an attendant can introduce cartridges into the library 1000 ("insert" operation), or the library 1000 can expel cartridges ("eject" operation). The I/O slots 1012 may be accessible by the attendant without disrupting operation of the accessor 1010 or drives 1006 (such as through an external door), although this is not necessary. Some examples of I/O slots 1012 include "pass-through" slots, a carriage, conveyor, normal storage-type slots designated as I/O slots, etc.

To move cartridges between the drives 1006, I/O slots 1012, and storage slots 1014, the library 1000 includes robotics such as an accessor 1010. The accessor 1010 maybe implemented by any suitable cartridge movement machinery, such as robotic arms, integrated cartridge loading equipment, conveyors, grippers movable on an X-Y coordinate system, etc.

The library 1000 operates under supervision of a controller 1008, which receives commands from the host 1002. These commands may request that the controller 1008 move cartridges from one host element address to another. The controller 1008 communicates with the host 1002 by interfaces such as wires/cables, one or more busses, fiber optic lines, wireless transmission, intelligent communications channel, etc. In addition to this host-controller interface, which constitutes a "control" path, the library 1000 also includes a data path that carries data between the host 1002 and a drive 1006. The control paths and the data paths may share the same interface or may comprise different interfaces.

Figure 9:
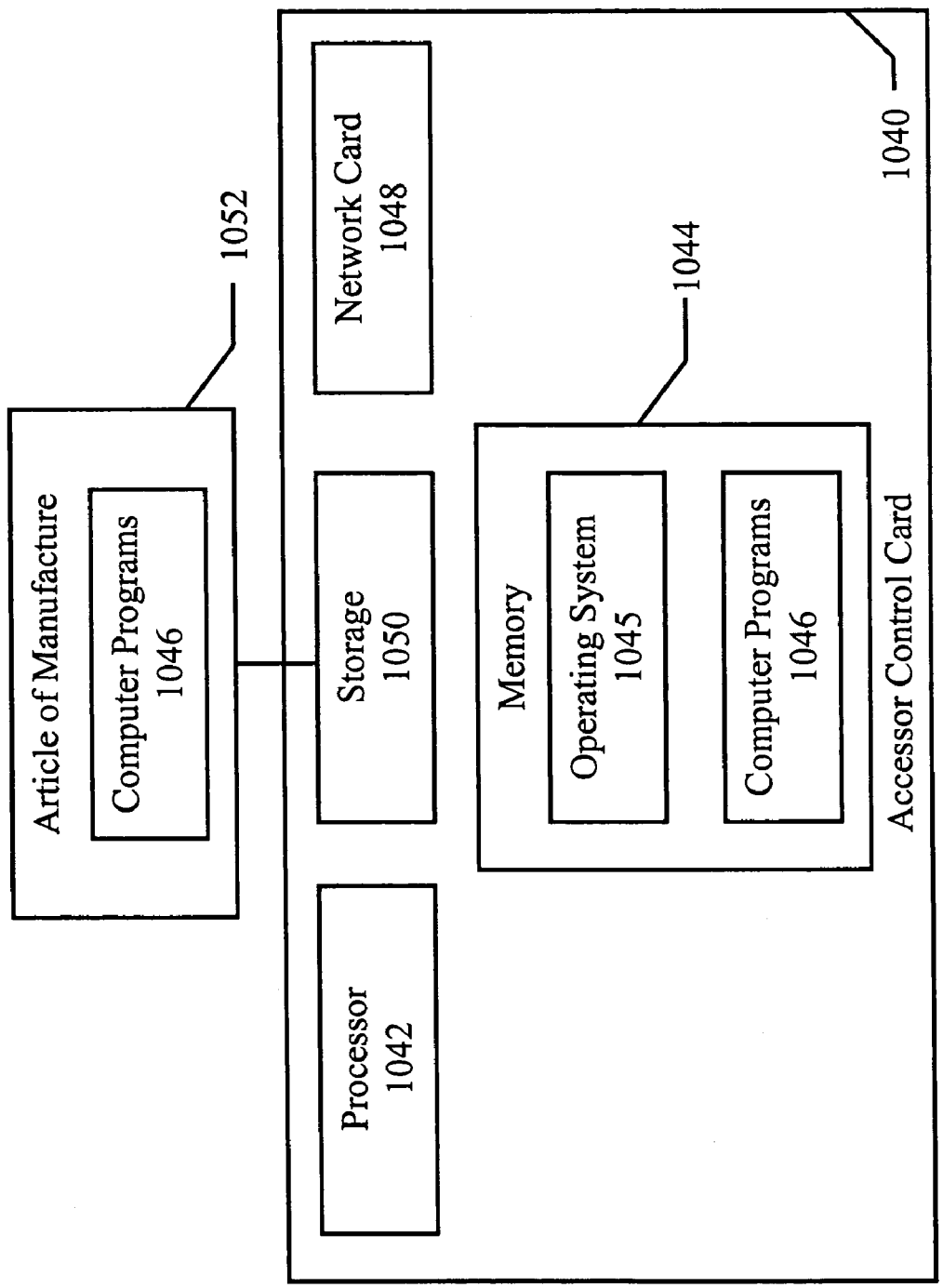
FIG. 9 is a block diagram illustrating the primary components of the accessor control card introduced in FIG. 8.

The controller 1008 may include an accessor control card 1040, as illustrated in FIG. 9. The accessor control card may include a digital data processing machine, logic circuit, construction of discrete circuit components, or other automated mechanism, and operates according to suitable programming, physical configuration, etc. To provide a specific example, the controller 1008 may comprise an IBM PowerPC processor. In this embodiment of the invention, the accessor control card 1040 includes a processor 1042 (e.g., a microprocessor), a memory 1044 (e.g., a volatile memory device), a network card 1048, and storage 1050 (e.g., a non-volatile storage area, such as magnetic disk drives, optical disk drives, a tape drive, non-volatile RAM, etc.). An operating system 1045 may execute in memory 1044. The storage 1050 may comprise an internal storage device or an attached or network accessible storage. Additionally, the storage 1050 may interface with an article of manufacture, such as a floppy-disk 1052, which contains algorithms such as computer programs 1046. These computer programs 1046 are loaded into the memory 1044 from the storage 1050 and executed by the processor 1042 in a manner known in the art.

The accessor control card 1040 may comprise any computing device known in the art, such as a mainframe, server, personal computer, workstation, laptop, handheld computer, telephony device, network appliance, virtualization device, storage controller, etc. Any processor 1042 and operating system 1045 known in the art may be used.

Referring back to FIG. 8, tables 1016, 1018, and 1020 are maintained by the controller 1008. The tables include a library map 1016, a library status table 1018, and a volser table 1020. The library map 1016 is a table that maps an application program's view of element addresses to the library's view of the physical elements. The library map 116 includes columns for a logical library number, a host element address (i.e., used by an application), a perceived type of location (i.e., storage element or import export element), and a physical element address (i.e., used by a library). A host element address is used by the application program and may refer to either a host storage element or a host import export element.

For each host element address, the library map 1016 identifies a corresponding physical element address, if one has been associated with that host element address. The library status table 1018 has columns for a physical element address, a full or empty status, a type of location, and a volume/serial number (i.e., a volser). As described above, a physical element address is used internally by the library. The volser table 1020 has columns for a volume/serial number, a physical element address, a logical library number, and a host element address. The technique of virtualizing import/export element addresses is described in U.S. patent application publication No. 20050043852, entitled "Method, system, and program for virtualization of data storage library addresses", filed on Aug. 22, 2003, by Frank David Gallo et al. which is incorporated by reference herein in its entirety.

Figure 10:
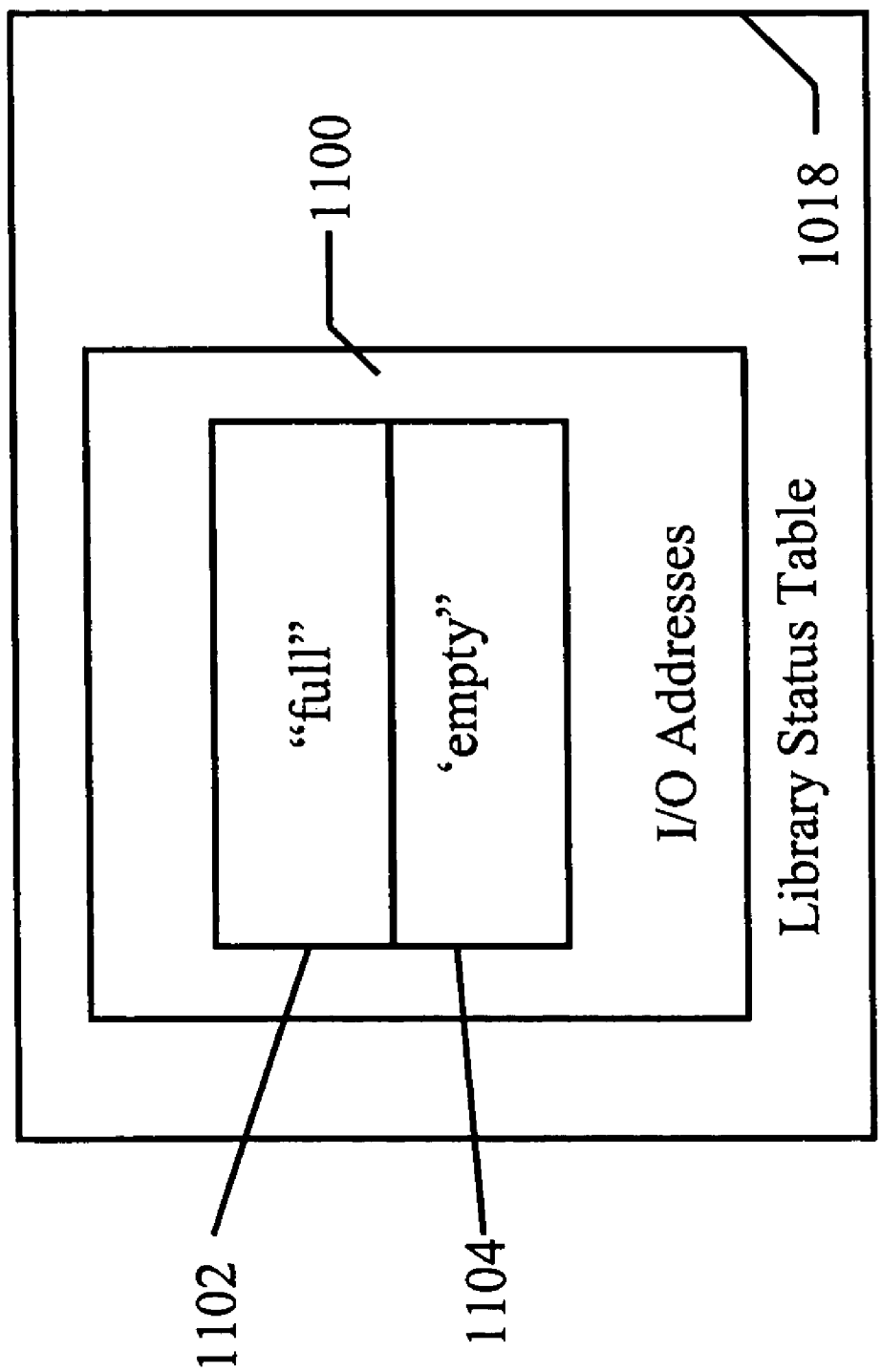
FIG. 10 is a block diagram illustrating a library status table, according to the invention.

The library status table 1018 is illustrated in FIG. 10. Here, a pair of I/O addresses 1100 corresponds to the upper I/O station 24 and lower I/O station 25 (FIG. 4). Here, the value of the first variable 1102 representing the status of the first I/O station 24 is "full." The value of the second variable 1104 representing the station of the lower I/O station 25 is "empty."

Figure 11:
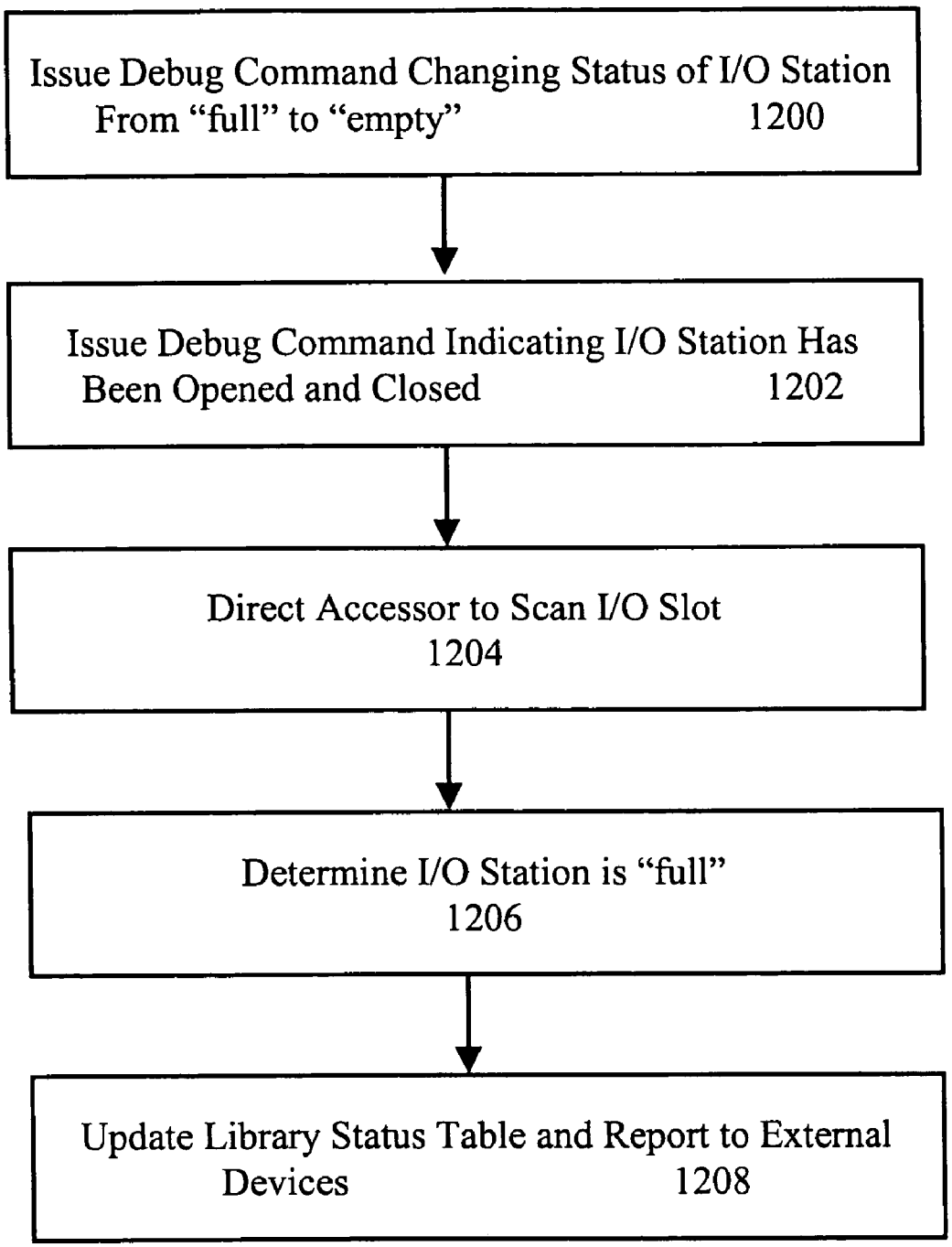
FIG. 11 is an algorithm simulating the insertion of a data storage medium into an import/export station, according to the invention.

In this embodiment of the invention, as illustrated by the algorithm of FIG. 11, removal of a tape cartridge from the upper I/O station 24 is simulated. In step 1200, a command is issued by the processor 1042 to change the status of the first variable from "full" to "empty." In step 1202, another command is issued that indicates that the I/O station has been opened and closed. This second command will trigger a scan of the corresponding I/O slot in step 1204 by the accessor 1010. A sensor (not shown) in the accessor 1010 will detect that the corresponding I/O slot is, in fact full instead of empty in step 1206. In step 1208, the processor will update the status of the first variable 1102 in the pair of I/O addresses 1100 and report this change to any interested host applications, computers, or devices.

Figure 12:
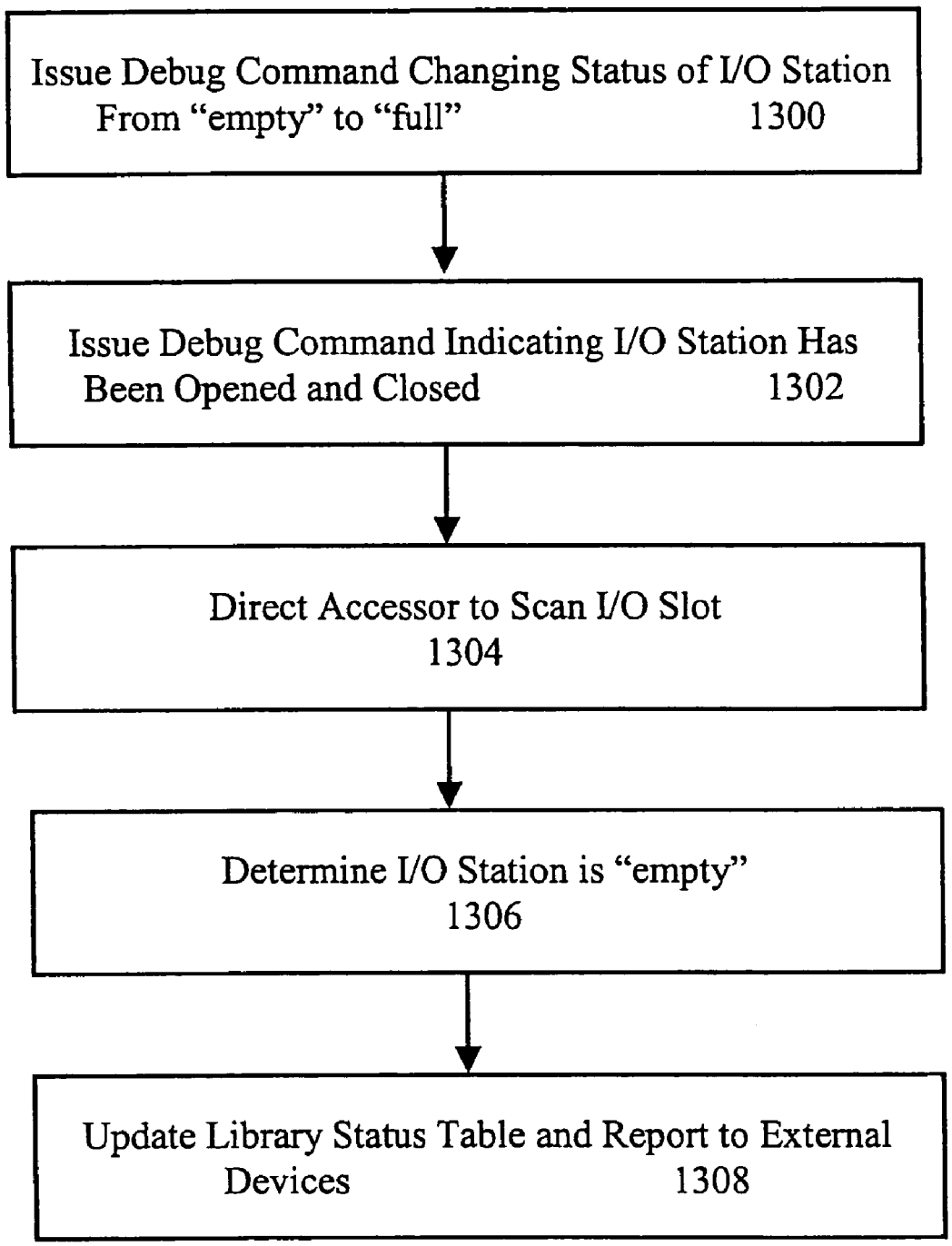
FIG. 12 is an algorithm simulating the ejection of a data storage medium from an import/export station, according to the invention.

A similar algorithm for simulating the removal of a tape cartridge is illustrated in FIG. 12. In step 1300, a command is issued by the processor 1042 to change the status of the second variable from "empty" to "full." In step 1302, another command is issued that indicates that the I/O station has been opened and closed. This second command will trigger a scan of the corresponding I/O slot in step 1304 by the accessor 1010. A sensor (not shown) in the accessor 1010 will detect that the corresponding I/O slot is, in fact empty instead of full in step 1306. In step 1308, the processor will update the status of the first variable 1102 in the pair of I/O addresses 1100 and report this change to any interested host applications, computers, or devices.

The indicated invention, as described, solves the problem of manually causing cartridge changes in the Import/Export stations in an automated data storage library in a static environment. Here, the term static environment refers to those Automated Data Storage Libraries where the tape library does not own the Import/Export Stations such that the host application is required to import/export tape cartridges into storage slots themselves. In other words, those tape cartridges in the import/export stations will remain in the import/export station slots until a host application imports them into the tape library. These type of systems are predominately mid-range open-system tape libraries.

The invention may also be extended to virtual environment tape libraries wherein the tape library owns the Import/Export Stations such that the tape library itself will manage all import/export to/from storage slots within the tape library. In other words, when a customer puts a tape cartridges into a import/export station slots, the tape library itself will automatically move it into a storage slot within the tape library without requiring any commands from the host application, as evidenced in an enterprise system.

A process, similar to the algorithms of FIGS. 11 and 12, implements the invention in a virtual environment. However, only some of the steps are reused and other steps have been added to generate the process illustrated in FIG. 13.

In step 1400, a user physically sets up the Import/Export stations to be half full and half empty (order does not matter). In step 1402, because this process is operating in a virtualized environment, the Tape Library will automatically move these cartridges from the Import/Export Station slots into storage slots within the Tape Library, leaving the Import/Export Station slots empty. The algorithm must wait until this step is complete before moving to step 1404 where a debug command is issued to the Automated Tape Library to move the virtual element address from the full Import/Export station slot to an empty Import/Export station slot. This needs to be done for all full virtual element addresses of the Import/Export Station slots.

The Automated Tape Library, in step 1406, will physically move the tape cartridge from the storage slots to the Import/Export Station slots. This results in the Import/Export Station slots again being populated with the same Tape Cartridges as they were originally. In step 1408, debug commands are issued to the Automated Tape Library so that the data represents the Import/Export Station Slots as exactly opposite of what is physically in the Import/Export Stations. In other words, the data should represent any physically full Import/Export Station slot as virtually empty and vice-versa. In step 1410, debug commands are issued to the Import/Export object indicating that the Import/Export Stations have been opened, and then closed. This simulated open/close of the Import/Export station will trigger a scan of the Import/Export station slots in step 1412, at which point the automated tape library will detect that, in fact, fulls are empty, and empties are full compared to the current data. These detected changes will then cause the stress activity described above including updating the library status table and report to external device in step 1414.

Figure 13:
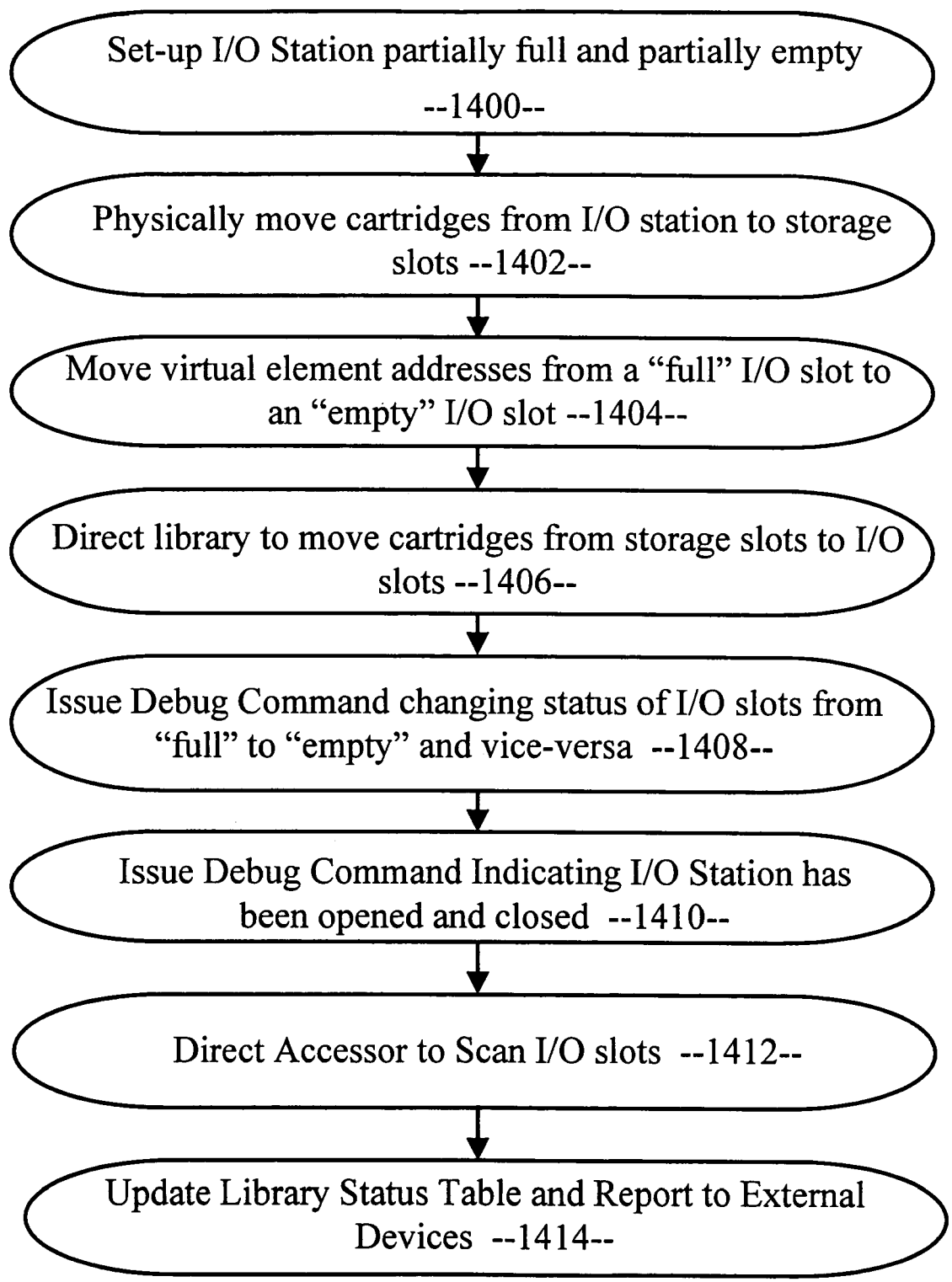
FIG. 13 is an algorithm simulating the ejection of a data storage medium from an import/export station in a virtualized system, according to the invention.

The primary difference between the static implementation of the process of FIG. 12 and the virtual implementation of the process of FIG. 13 is that the virtual implementation has to wait until the tape library automatically moves tape cartridges from the Import/Export Station slots to storage slots and also to move the same tape cartridges back to the Import/Export Station slots.

Those skilled in the art of data management systems may develop other embodiments of the present invention. However, the terms and expressions which have been employed in the foregoing specification are used therein as terms of description and not of limitation, and there is no intention in the use of such terms and expressions of excluding equivalents of the features shown and described or portions thereof, it being recognized that the scope of the invention is defined and limited only by the claims which follow.

We claim:

1. A simulated data storage medium insertion/ejection system, comprising:
   an import/export station having a plurality of I/O slots adapted to transfer storage media to and from a storage library, wherein at least one I/O slot is full and at least one I/O slot is empty;
   a memory device for storing a variable having a value representing a status of each of the plurality of import/export station I/O slots;
   a processor in communication with the memory device; and
   a sensor for detecting the status of each import/export station I/O slot in communication with the processor;
   wherein the processor is adapted to ascertain a correct value of the variable for each import/export I/O slot using said sensor, modify the value of the variable so as to be inconsistent with the status of the import/export station I/O slot and to simulate an opening and closing of a door of the import/export station I/O slots, thereby triggering a scan by the sensor of the-import/export station I/O slots to determine the status of each of the plurality of import/export station I/O slots;
   wherein the processor is further adapted to update the value of the variable so as to be consistent with the status of the import/export station I/O slots based on said scanning; and
   wherein the processor is further adapted to report the update of the value of the variable to an external device.

2. The system of claim 1, wherein the data storage medium includes a tape cartridge.

3. An automated data storage library, comprising:
   an import/export station for receiving and ejecting a data storage medium, the input/export station having a plurality of I/O slots adapted to transfer storage media to and from said automated data storage library, wherein at least one I/O is full and at least one I/O slot is empty;
   a memory device for storing a variable having a value representing a status of each of the import/export station I/O slots;
   a processor in communication with the memory device; and
   a sensor for detecting the status of each of the import/export station I/O slots in communication with the processor;
   wherein the processor is adapted to ascertain a correct value of the variable, modify the value of the variable so as to be inconsistent with the status of each of the import/export station I/O slots and to simulate an opening and closing of a door of the import/export station, thereby triggering a scan by the sensor of each of the import/export station I/O slots to determine the status of each of the plurality if import/export station I/O slots;
   wherein the processor is further adapted to update the value of the variable so as to be consistent with the status of each of the plurality of import/export station I/O slots in response to the scan by the sensor of the import/export stations; and
   wherein the processor is further adapted to report the update of the value of the variable to an external device.

4. The automated data storage library of claim 3, wherein the data storage medium includes a tape cartridge.

5. A method of simulating a change in a status of an import/export station having a plurality of I/O slots adapted to transfer storage media to and from a storage library, wherein at least one I/O slot is full and at least one I/O slot is empty, the method comprising the steps of:
   ascertaining a correct value of a variable representing the status of each of the plurality of import/export station I/O slots;
   modifying the variable so as to be inconsistent with the status of each of the plurality of import/export station I/O slots;
   simulating an opening and closing of a door of the import/export station, thereby triggering a scan to determine the status of each of the plurality of import/export station I/O slots; and
   updating the variable so as to be consistent with the status of each of the plurality of import/export station I/O slots, and
   reporting the step of updating the variable to an external device.

6. The method of claim 5, further comprising the step of scanning each of the import/export station I/O slots.

7. The method of claim 5, wherein the variable may include a value indicating that a data storage medium is inserted into said at least one of the import/export station I/O slots.

8. The method of claim 5, wherein the variable may include a value indicating that said at least one of the import/export station I/O slots is empty.

9. The method of claim 7, wherein the data storage medium includes a tape cartridge.

10. The method of claim 5, further comprising the step of moving a virtual element address from a full import/export station slot to an empty import/export station slot prior to said step of modifying the variable representing the status of one of the import/export station I/O slots so as to be inconsistent with the status of said import/export station I/O slots.

11. The method of claim 10, further comprising the step of placing a data storage device into a slot of the import/export station prior to said step of moving the virtual element address from the full import/export station slot to the empty import/export station slot.

12. The method of claim 10, further comprising the step of populating the slots of the import/export station such that the slots of the import/export station are half-full and half-empty prior to said step of moving the virtual element address from the full import/export station slot to the empty import/export station slot.

* * * * *